C. E. TOMLINSON.

MEANS FOR HOLDING RECORD RECEIVING ELEMENTS.

APPLICATION FILED AUG. 15, 1911.

Reissued Feb. 4, 1913. 13,523.

WITNESSES:

Chas. H. Young.

S. Dain.

INVENTOR

Charles E. Tomlinson

BY

Parsons Hacc & Bodell

ATTORNEYS

UNITED STATES PATENT OFFICE.

CHARLES E. TOMLINSON, OF SYRACUSE, NEW YORK, ASSIGNOR TO ARTHUR E. PARSONS, TRUSTEE, OF SYRACUSE, NEW YORK.

MEANS FOR HOLDING RECORD-RECEIVING ELEMENTS.

13,523. Specification of Reissued Letters Patent. Reissued Feb. 4, 1913.

Original application filed August 27, 1908, Serial No. 450,470. Renewed October 8, 1910, Serial No. 586,071. Original No. 997,427, dated July 11, 1911. Application for reissue filed August 15, 1911. Serial No. 644,261.

*To all whom it may concern:*

Be it known that I, CHARLES E. TOMLINSON, of Syracuse, in the county of Onondaga and State of New York, have invented a certain new and useful Means for Holding Record-Receiving Elements, of which the following is a specification.

My invention has for its object the production of a particularly simple and efficient means for holding record-receiving elements, and it consists in the combinations and constructions hereinafter set forth and claimed.

In describing this invention reference is had to the accompanying drawing in which like characters designate corresponding parts in all the views.

Figure 1:
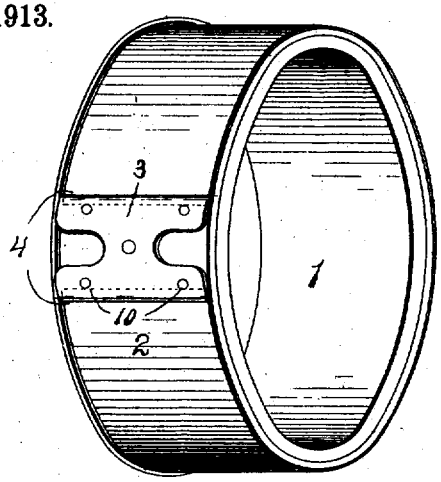
Figure 2:
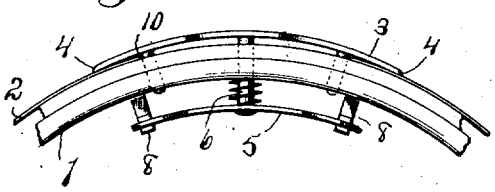
Figure 3:
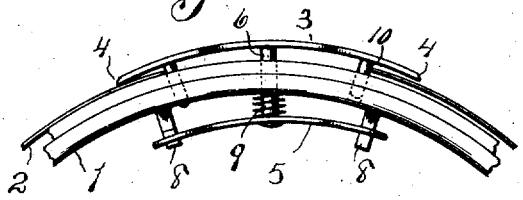
Figure 4:
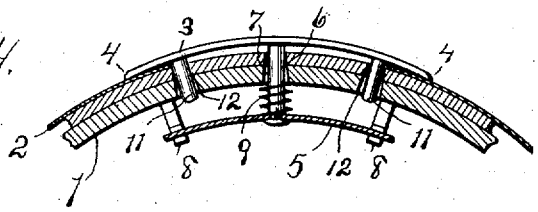
Figure 5:
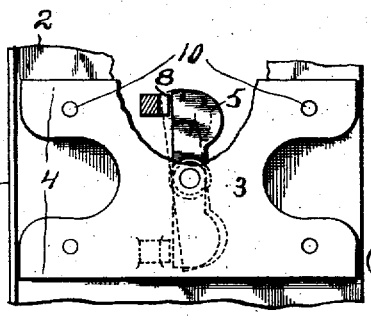

Figure 1 is a perspective of one embodiment of my invention. Figs. 2 and 3 are fragmentary elevations of parts seen in Fig. 1. Fig. 4 is a longitudinal sectional view of parts seen in Fig. 2. Fig. 5 is a plan, partly broken away, of parts seen in Figs. 2, 3 and 4.

This means for holding the ends of record-receiving elements or sheets comprises a supporting member and a clamping instrumentality having means for engaging the opposite ends of the record sheet and operable to release one end of the record sheet without releasing the other end and being also usually operable to release both ends of the record sheet simultaneously.

In the illustrated embodiment of my invention the means for holding the record-receiving elements or sheets comprises a supporting member and a clamping member having engaging means at opposite sides of its central portion for coöperating with the supporting member and holding the ends of a record-receiving element, the clamping member being movable relatively to the supporting member on either of said engaging means as a fulcrum point, for releasing the end of the record-receiving element held by the other engaging means.

The supporting member 1 may be of any desirable form size and construction, and is here shown as a drum around which is wrapped a record-receiving element 2, this element 2 being of less length than the perimeter of the supporting member 1. The clamping member 3 is located opposite to the periphery of the drum 1, is bowed outwardly from said drum so that its central portion is spaced apart from the periphery of the drum, and its opposite end edges 4 engage the ends of the record-receiving element 2 on the periphery of the drum 1, Figs. 2 and 5. The edges 4 constitute engaging means on opposite sides of the central portion of the clamping member for coöperating with the supporting member 1 and holding the ends of the record-receiving element 2.

As here illustrated the means for moving the clamping member 3 on either of the edges 4 as a fulcrum point, and raising the other edge 4 and thereby releasing the end of the record-receiving element 2 held by said other edge 4, comprises an operating piece 5 located within the drum 1 opposite to the clamping member 3, this operating piece being carried on a spindle 6 extending through a guide 7 in the cylindrical wall of the drum 1, and rigidly connected at one end to the central portion of the clamping member. The operating piece 5 is preferably pivoted to the spindle 6 intermediate of its ends and coöperates at opposite sides of the spindle with catches 8 carried by the supporting member or drum 1. The opposite ends of the operating piece are movable toward and from the inner face of the drum 1 for raising either edge 4 of the clamping member out of normal or operative position, and said operating piece is movable laterally on the spindle 6 into engagement with either of the catches 8 when either edge 4 is raised out of engagement with the record-receiving element, in order to temporarily hold either edge 4 out of its normal or operative position. A spring 9 is interposed between the inner face of the drum 1 and the operating piece 5 for holding said piece 5 in its normal position, this spring being preferably coiled around the spindle 6.

Stops 10 are provided for engaging the end edges of the record-receiving element 2, and these stops are here shown as pins or projections 11 provided on the clamping member between the central portion of the clamping member and the edges 4, these pins extending inwardly into holes or guides 12 formed in the supporting member 1. The holes or guides 7 and 12 are tapered and are larger at their inner ends, for permitting the movement of the clamping member on either of its edges 4 as a fulcrum. The spindle 6 and pins 11 also tend to hold the clamping member in position and guide it in its movement.

In use one hand can operate the clamping member, while the other is manipulating the record-receiving element and one end of the record-receiving element having been placed in position, it will not be released from the clamping member while the other end is being placed in position.

What I claim is:—

1. Means for holding the ends of record sheets comprising a supporting member, and a clamping instrumentality having means for engaging opposite ends of the record sheet, said instrumentality being operable to release the means engaging one end of the record sheet without releasing the means engaging the other end of said record sheet, substantially as and for the purpose described.

2. Means for holding the ends of record sheets comprising a supporting member, and a clamping instrumentality having means for engaging opposite ends of the record sheet and also having a handle by which the instrumentality is operated to release one end of the record sheet without releasing the other, substantially as and for the purpose specified.

3. Means for holding the ends of record sheets comprising a supporting member, and a clamping instrumentality having means for engaging opposite ends of the record sheet, said instrumentality being operable to release the means engaging one end of the record sheet without releasing the means engaging the other end of said record sheet, and being also operable to release both of said engaging means simultaneously, substantially as and for the purpose set forth.

4. Means for holding the ends of record sheets comprising a supporting member, and a clamping instrumentality having means for engaging opposite ends of the record sheet, said instrumentality being operable to release the means engaging one end of the record sheet without releasing the means engaging the other end of said record sheet, and being also operable to release both of said means simultaneously, said instrumentality including a handle by means of which the various operations thereof are effected, substantially as and for the purpose described.

5. Means for holding the ends of record sheets comprising a supporting member, and a clamping instrumentality having means for engaging opposite ends of the record sheet, the instrumentality being operable to release one end of the record sheet without releasing the other, and means for resisting the releasing operations, substantially as and for the purpose specified.

6. Means for holding the ends of record sheets comprising a supporting member consisting of a drum adapted to support a record sheet on its periphery, and a clamping instrumentality carried by the drum and having means for engaging opposite ends of the record sheet and being operable to release one end of the record sheet without releasing the other, substantially as and for the purpose set forth.

7. Means for holding the ends of record sheets comprising a supporting member consisting of a drum adapted to support a record sheet on its periphery, and a clamping instrumentality carried by the drum and having means for engaging opposite ends of the record sheet, and being operable to release one end of the record sheet, without releasing the other, or to release both ends of the record sheet simultaneously, substantially as and for the purpose described.

8. Means for holding the ends of record-receiving elements, comprising a supporting member, and a clamping member having engaging means on opposite sides of its central portion for coöperating with the supporting member and holding, respectively, the ends of a record-receiving element, the clamping member being movable relatively to the supporting member on either of said engaging means as a fulcrum point, for releasing the end of the record-receiving element held by the other engaging means, substantially as and for the purpose described.

9. Means for holding the ends of record-receiving elements, comprising a supporting member, a clamping member located on one side of the supporting member and having engaging means on opposite sides of its central portion for coöperating with the supporting member and holding, respectively, the ends of a record-receiving element, and an operating piece located on the opposite side of the supporting member and connected to the clamping member between said engaging means, said piece operating to move the clamping member relatively to the supporting member on either of said engaging means as a fulcrum point, for releasing the end of the record-receiving element held by the other engaging means, substantially as and for the purpose specified.

10. Means for holding the ends of record-receiving elements, comprising a supporting member, a clamping member having engaging means on opposite sides of its central portion for coöperating with the supporting member and holding, respectively, the ends of a record-receiving element, the clamping member being movable relatively to the supporting member on either of said engaging means as a fulcrum point, for releasing the end of the record-receiving element held by the other engaging means, and a spring acting to hold the clamping member in its normal or clamping position, substantially as and for the purpose set forth.

11. Means for holding the ends of record-receiving elements, comprising a supporting member, a clamping member located on one side of the supporting member and having engaging means on opposite sides of its central portion for coöperating with the supporting member and holding, respectively, the ends of a record-receiving element, an operating piece located on the opposite side of the supporting member and connected to the clamping member between said engaging means, said piece operating to move the clamping member relatively to the supporting member on either of said engaging means as a fulcrum point, for releasing the end of the record-receiving element held by the other engaging means, and a spring interposed between the supporting member and the operating piece for holding the clamping member in its normal or clamping position, substantially as and for the purpose described.

12. Means for holding the ends of record-receiving elements, comprising a supporting member, a clamping member located on one side of the supporting member and having engaging means on opposite sides of its central portion for coöperating with the supporting member and holding, respectively, the ends of a record-receiving element, an operating piece located on the opposite side of the supporting member, and a part rigidly connecting the intermediate portions of the clamping member and the operating piece, said piece operating to move the clamping member relatively to the supporting member on either of said engaging means as a fulcrum point, for releasing the end of the record-receiving element held by the other engaging means, substantially as and for the purpose specified.

13. Means for holding the ends of record-receiving elements, comprising a supporting member, a clamping member located on one side of the supporting member and having engaging means on opposite sides of its central portion for coöperating with the supporting member and holding, respectively, the ends of a record-receiving element, an operating piece located on the opposite side of the supporting member, a spindle connecting the intermediate portions of the clamping member and the operating piece, and a spring encircling the spindle and interposed between the supporting member and the operating piece, said piece operating to move the clamping member relatively to the supporting member against the spring, on either of said engaging means as a fulcrum point, for releasing the end of the record-receiving element held by the other engaging means, substantially as and for the purpose set forth.

14. Means for holding the ends of record-receiving elements, comprising a supporting member, a clamping member located on one side of the supporting member and having engaging means on opposite sides of its central portion for coöperating with the supporting member and holding, respectively, the ends of a record-receiving element, an operating piece located on the opposite side of the supporting member and connected to the clamping member between said engaging means, said piece operating to move the clamping member relatively to the supporting member on either of said engaging means as a fulcrum point, for releasing the end of the record-receiving element held by the other engaging means, and catches for coöperating with the operating piece for holding the clamping member in its position assumed when either of the engaging means thereof is out of operative position, substantially as and for the purpose described.

15. Means for holding the ends of record-receiving elements, comprising a supporting member having catches spaced apart, a clamping member located on one side of the supporting member and having engaging means on opposite sides of its central portion for coöperating with the supporting member and holding, respectively, the ends of a record-receiving element, a spindle fixed to the intermediate portion, of the clamping member and extending through the supporting member between said catches, and an operating piece located on the opposite side of the supporting member and pivoted on said spindle, opposite ends of said piece being movable toward the supporting member for moving the clamping member relatively to the supporting member on either of said engaging means as a fulcrum point, for releasing the end of the record-receiving element held by the other engaging means, and being movable laterally on its pivot for coöperating with the catches associated with the supporting member, substantially as and for the purpose specified.

16. Means for holding the ends of record-receiving elements, comprising a supporting member, a clamping member having engaging means on opposite sides of its central portion for coöperating with the supporting member and holding, respectively, the ends of a record-receiving element, the clamping member being movable relatively to the supporting member on either of said engaging means as a fulcrum point, for releasing the end of the record-receiving element held by the other engaging means, one of said members having stops for engaging the end edges of the record-receiving element, substantially as and for the purpose set forth.

17. Means for holding the ends of record-receiving elements, comprising a supporting member, and a clamping member having engaging means on opposite sides of its central portion for coöperating with the supporting member and holding, respectively, the ends of a record-receiving element, the clamping member being movable relatively to the supporting member on either of said engaging means as a fulcrum point, for releasing the end of the record-receiving element held by the other engaging means, and the clamping member having stops for engaging the end edges of the record-receiving element, substantially as and for the purpose described.

18. Means for holding the ends of record-receiving elements, comprising a supporting member, and a clamping member having engaging means on opposite sides of its central portion for coöperating with the supporting member and holding, respectively, the ends of a record-receiving element, the clamping member being provided with projections arranged between the engaging means and extending into the supporting member, the projections serving to engage the end edges of the record-receiving element, and the clamping member being movable relatively to the supporting member on either of said engaging means as a fulcrum point, for releasing the end of the record-receiving element held by the other engaging means, substantially as and for the purpose specified.

19. Means for holding the ends of record-receiving elements, comprising a supporting member, a clamping member located on one side of the supporting member and having engaging means on opposite sides of its central portion for coöperating with the supporting member and holding, respectively, the ends of a record-receiving element, the clamping member being provided with projections arranged between the engaging means and extending into the supporting member, the projections serving to engage the ends of the record-receiving element, and an operating piece located on the opposite side of the supporting member and connected to the clamping member between said engaging means and between said projections, said piece operating to move the clamping member relatively to the supporting member on either of said engaging means as a fulcrum point, for releasing the end of the record-receiving element held by the other engaging means, substantially as and for the purpose set forth.

20. Means for holding the ends of record-receiving elements, comprising a supporting member, a clamping member located on one side of the supporting member and having engaging means on opposite sides of its central portion for coöperating with the supporting member and holding, respectively, the ends of a record-receiving element, the clamping member being provided with projections arranged between the engaging means and extending into the supporting member, the projections serving to engage the end edges of the record-receiving element, and the clamping member having also a spindle fixed to the intermediate portion thereof, an operating piece located on the opposite side of the supporting member and mounted on said spindle, and a spring interposed between the supporting member and the operating piece, said piece operating to move the clamping member relatively to the supporting member against the spring on either of said engaging means as a fulcrum point, for releasing the end of the record-receiving element held by the other engaging means, substantially as and for the purpose described.

21. Means for holding record-receiving elements comprising a supporting member consisting of a drum, and a clamping member carried by the drum and having engaging means on opposite sides of its central portion for coöperating with the periphery of the drum and holding, respectively, the ends of the record-receiving element supported on the periphery of the drum, the clamping member being movable relatively to the drum on either of said engaging means as a fulcrum point, for releasing the end of the record-receiving element held by the other engaging means, substantially as and for the purpose specified.

22. Means for holding record-receiving elements comprising a supporting member consisting of a drum, a clamping member carried by the drum and having engaging means on opposite sides of its central portion for coöperating with the periphery of the drum and holding, respectively, the ends of a record-receiving element supported on the periphery of the drum, and an operating piece located within the drum and connected to the clamping member between said engaging means, said piece operating to move the clamping member relatively to the drum on either of said engaging means as a fulcrum point, for releasing the ends of the record-receiving element held by the other engaging means, substantially as and for the purpose set forth.

23. Means for holding record-receiving elements comprising a supporting member consisting of a drum, a clamping member opposed to the periphery of the drum and having engaging means on opposite sides of its central portion for coöperating with the periphery of the drum and holding, respectively, the ends of a record-receiving element supported on the periphery of the drum, an operating piece located within the drum, a spindle extending through the cylindrical wall of the drum and connected to the intermediate portions of the clamping member and the operating piece, and a spring encircling the spindle and interposed between the inner face of the drum and the operating piece, said piece operating to move the clamping member relatively to the drum against the spring on either of said engaging means as a fulcrum point, for releasing the end of the record-receiving element held by the other engaging means, substantially as and for the purpose described.

24. Means for holding record-receiving elements comprising a supporting member consisting of a drum, a clamping member opposed to the periphery of the drum and having engaging means on opposite sides of its central portion for coöperating with the periphery of the drum and holding, respectively, the ends of a record-receiving element, supported on the periphery of the drum, the clamping member being provided with projections arranged between the engaging means and extending into the drum, said projections serving to engage the end edges of the record-receiving element, and the clamping member being also provided with a spindle fixed to the intermediate portion thereof, an operating piece located within the drum and mounted on said spindle, and a spring interposed between the inner face of the drum and the operating piece, said piece operating to move the clamping member relatively to the periphery of the drum against the spring on either of the said engaging means as a fulcrum point, for releasing the end of the record-receiving element held by the other engaging means, substantially as and for the purpose specified.

25. Means for holding record-receiving elements comprising a supporting member consisting of a drum, a clamping member having engaging means on opposite sides of its central portion for coöperating with the periphery of the drum and holding, respectively, the ends of a record-receiving element supported on the periphery of the drum, and an operating piece located within the drum and connected to the clamping member between said engaging means, said piece operating to move the clamping member relatively to the drum on either of said engaging means as a fulcrum point, for releasing the end of the record-receiving element held by the other engaging means, and catches projecting from the inner face of the drum for holding the clamping member in its position assumed when either of the engaging means thereof is out of operative position, substantially as and for the purpose set forth.

26. Means for holding record-receiving elements comprising a supporting member consisting of a drum, a clamping member bowed outwardly, relatively, to the periphery of the drum, and having opposite edges thereof coöperating with the periphery of the drum and holding, respectively, the ends of a record-receiving element, manually-operated means for moving the clamping member relatively to the periphery of the drum on either of said edges as a fulcrum point, for releasing the end of the record-receiving element held by the other of said edges, substantially as and for the purpose described.

27. Means for holding record-receiving elements comprising a supporting member consisting of a drum, a clamping member bowed outwardly, relatively, to the periphery of the drum and having opposite edges thereof coöperating with the periphery of the drum and holding, respectively, the ends of a record-receiving element, the clamping member being provided with projections arranged between said edges and extending into the supporting member, the projections serving to engage the end edges of the record-receiving element and also to guide the clamping member in its movement relatively to the periphery of the drum, and the clamping member being also provided with a spindle fixed to the intermediate portion thereof and extending through the opposing part of the drum, an operating piece mounted on the spindle within the drum, and a spring interposed between the inner face of the drum and the operating piece, said piece operating to move the clamping member relatively to the periphery of the drum against the spring on either of said edges as a fulcrum point, for releasing the end of the record-receiving element held by the other of said edges, substantially as and for the purpose specified.

In testimony whereof, I have hereunto signed my name in the presence of two attesting witnesses at Syracuse, in the county of Onondaga, in the State of New York, this 25th day of August, 1908.

CHARLES E. TOMLINSON.

Witnesses:

S. Davis,

H. Kaufman.